A. F. BATCHELDER.
ELECTRIC LOCOMOTIVE.
APPLICATION FILED NOV. 7, 1910.
1,008,937.
Patented Nov. 14, 1911.
2 SHEETS—SHEET 1.
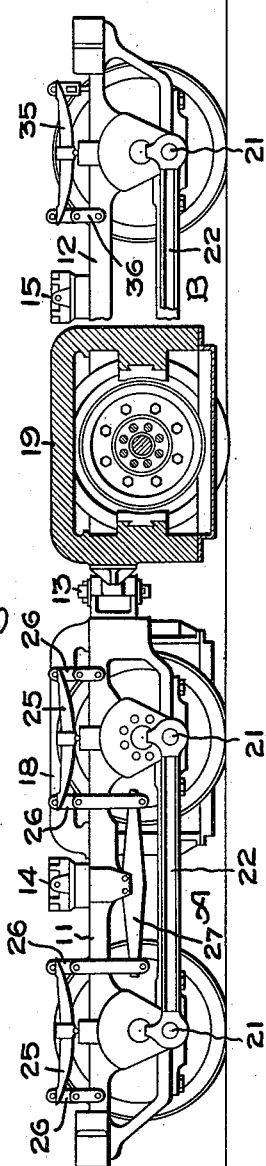
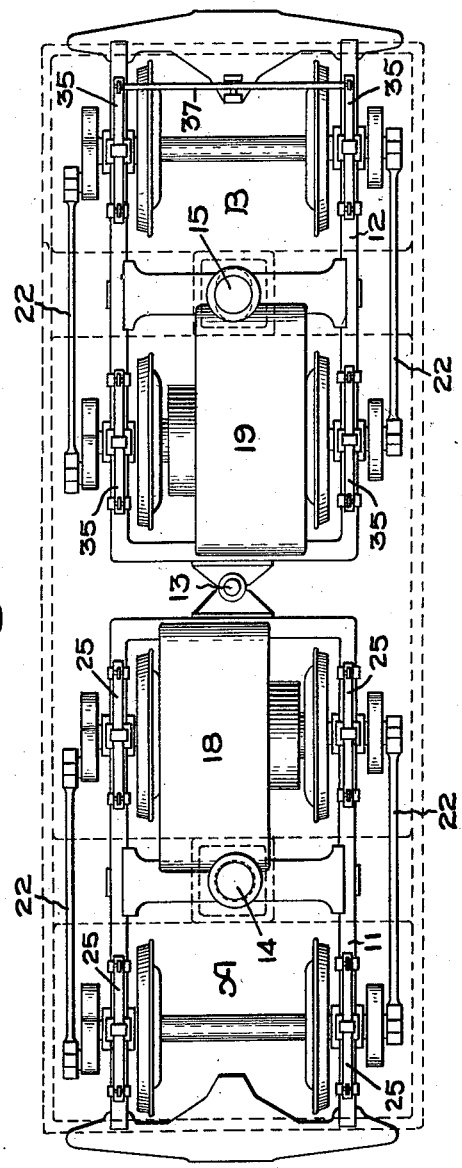
Witnesses:
Earl G. Klock.
J. Ellis Ely
Inventor:
Asa F. Batchelder,
by Albert H. Davis
His Attorney A. F. BATCHELDER.
ELECTRIC LOCOMOTIVE.
APPLICATION FILED NOV. 7, 1910.
1,008,937.
Patented Nov. 14, 1911.
2 SHEETS—SHEET 2.
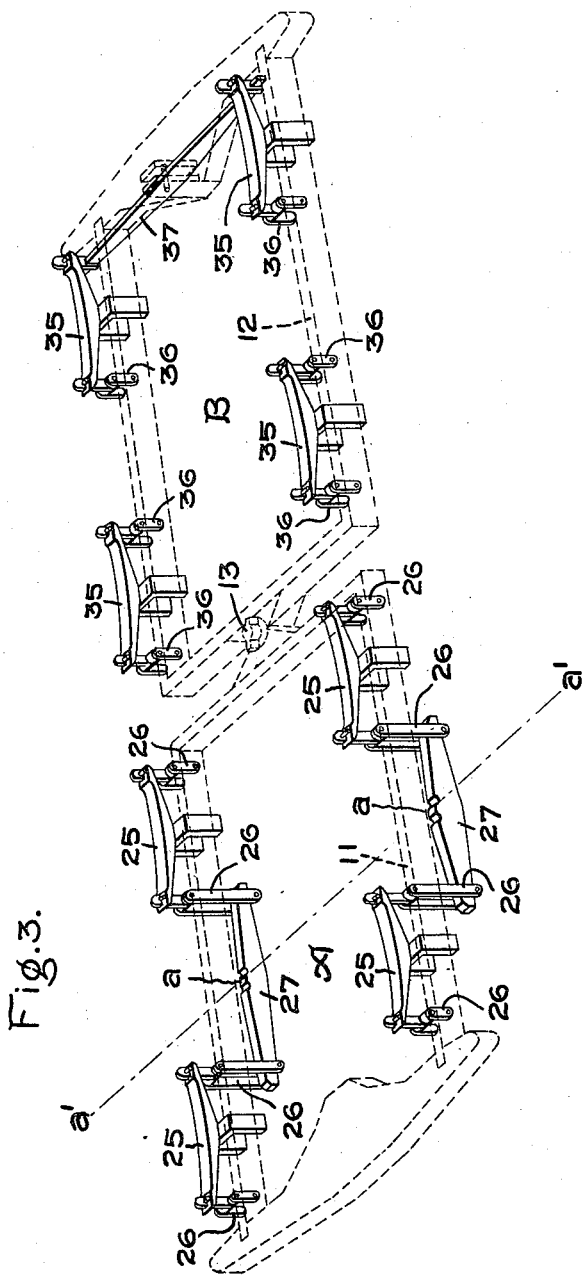
Witnesses:
Earl G. Klock
J. Ellis Glen
Inventor:
Asa F. Batchelder,
by Albert G. Davis
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC LOCOMOTIVE.

1,008,937.  Specification of Letters Patent.  Patented Nov. 14, 1911.

Original application filed April 30, 1909, Serial No. 493,093. Divided and this application filed November 7, 1910. Serial No. 590,956.

*To all whom it may concern:*

Be it known that I, ASA F. BATCHELDER, a citizen of the United States, residing at Schenectady, in the county of Schenectady, State of New York, have invented certain new and useful Improvements in Electric Locomotives, of which the following is a specification.

The present application is a division of my prior application, Serial No. 493,093, filed April 30, 1909.

My invention relates to electric locomotives and particularly to two-truck locomotives.

The object of my invention is to provide a new and improved system of suspension whereby the truck frames are supported upon the wheel axles in order to allow movement of said axles with reference to the truck frames without straining and distorting the latter.

In carrying out the above mentioned object of my invention, I provide in a two-truck locomotive, a spring system of suspension for supporting one of the truck frames upon its wheel axles jointly at two points and another spring system of suspension for supporting the other truck frame on its wheel axles jointly at three points, a leading connection being provided between the trucks. With this arrangement the truck frame, which in effect is supported upon its wheel axles jointly at three points, is in stable equilibrium and the other truck frame, which in effect is supported upon its wheel axles jointly at two points, is in unstable equilibrium and is held stable by the leading connection with the other truck.

For a better understanding of my invention, reference may be had to the following description taken in connection with the accompanying drawing, in which—

Figure 1 is a side elevation of the trucks of a two-truck locomotive, a portion of the frame of one truck being broken away and a motor on that truck being shown in cross-section; Fig. 2 is a plan of the truck shown in Fig. 1, the body frame of the cab of the locomotive being shown in outline in dash lines, and Fig. 3 is a view in perspective illustrating the system of spring suspension for each of the trucks.

Referring to the drawings, the trucks A and B are shown as each provided with two pairs of wheels, the axles of which are mounted for limited vertical movement in truck frames 11 and 12 of similar design. The journal boxes for these axles and the manner in which they are mounted in the truck frames need not be described here since they may be of any well known style, and form no part of my invention. Each truck frame is supported upon the journal boxes of its axles by spring systems of suspension hereinafter described. The trucks are connected by a leading or guiding connection 13 of any suitable and well known form, this connection serving as a hinged joint between the trucks through which the tractive effort of one truck is transmitted to the other, it being understood that in the particular locomotive shown the draw bars are mounted upon the truck frames. The truck A is connected to the body frame of the cab by a pivotal connection 14, of any well known form, and the truck B is connected to the body frame by a pivotal and longitudinally sliding connection 15, also of any well known form. The trucks A and B are provided, respectively, with motors 18 and 19 arranged in coöperative relation to the axles of said trucks which are nearest one another, or in other words, nearest the middle of the locomotive. These motors are shown as of the bipolar type in which the armature surrounds the wheel axle, the field structure of each motor being built into and forming a part of the truck frame. The manner in which the armatures of these motors are supported around the wheel axles will be fully described and claimed in another divisional application. The wheel axles of each truck are geared together by crank pins and connecting rod connections as clearly shown in Figs. 1 and 2, the crank pins being shown at 21 and the connecting rods at 22. The cranks on each wheel axle at opposite sides of the truck are, of course, set at right angles in order that the connecting rods on both sides of the truck may never be upon dead center at the same time.

Referring particularly to Fig. 3, in which the system of suspension for the truck frames is diagrammatically illustrated in perspective, it is seen that the frame of the truck A is supported upon its four journal boxes by springs 25, links 26 and equalizing levers 27 arranged as clearly shown. With this arrangement, each side of the truck is in effect supported jointly upon the two journal boxes on that side at a point *a*. This means that the frame of the truck A is in effect supported in unstable equilibrium about an axis *a' a'* passing through the points *a a*. The frame of the truck B, however, is supported upon its journal boxes through springs 35, links 36 and one equalizing lever 37 arranged as shown. With this arrangement, the frame of the truck B is in effect supported at three points,—two points being over the journal boxes of one axle, while the third point is midway across one end of the truck where the lever 37 is pivotally supported in the truck frame. Or, stating this another way, one end of the truck is supported at each side upon the journal boxes of one of the axles, while the other end of the truck is supported near its middle jointly upon the journal boxes of the other axle. With this arrangement, the frame of the truck B is given three point suspension and is, therefore, in stable equilibrium. The leading connection 13 between the trucks A and B gives a third point of suspension for the frame of the truck A and this truck is, therefore, by the aid of this connection held in stable equilibrium. It is evident that with this system of suspension, the truck frames are supported upon their wheel axles in such a manner that movement of said axles with reference to said frames will cause merely a bodily movement of said frames without straining or twisting the latter, it being understood that the guiding connection 13 permits not only a movement of one truck with reference to the other in a horizontal plane, but also a slight universal movement of one truck with reference to the other.

What I claim as new, and desire to secure by Letters Patent of the United States, is:—

1. In a locomotive, two trucks each having a plurality of pairs of wheels, a spring system of suspension for supporting one of said truck frames on its wheel axles jointly at two points, a spring system of suspension for supporting the other truck frame upon its wheel axles jointly at three points, and a leading connection between said trucks.

2. In a locomotive, two trucks each having a plurality of pairs of wheels, a spring system of suspension for supporting one of said truck frames on its wheel axles jointly at two points one on each side of said truck, a spring system of suspension for supporting the other truck frame upon its wheel axles jointly at three points, and a leading connection between said trucks.

3. In a locomotive, two trucks having a plurality of pairs of wheels, a spring system of suspension supporting one of said truck frames on its wheel axles jointly at two points one on each side of said truck, a spring system of suspension for supporting the other truck frame upon its wheel axles jointly at three points, one on each side and near one end of said truck and one at substantially the middle point of the other end of said truck, and a leading connection between said trucks.

4. In a locomotive, two trucks each having a plurality of pairs of wheels the axles of which are journaled in journal boxes arranged for vertical movement in the side frames of said trucks; springs, links and equalizing levers for supporting one of said truck frames on its journal boxes jointly at two points each substantially midway of each side of said truck; springs, links and equalizing levers for supporting the other truck frame upon its journal boxes jointly at three points one on each side of said truck near one end thereof and the other substantially midway transversely of said truck near the other end thereof, and a leading connection between said trucks.

5. In a locomotive, two trucks each having two pairs of wheels the axles of which are journaled in journal boxes arranged for vertical movement in the side frames of said trucks; springs, links and an equalizing lever on each side of one truck frame for supporting the latter on each side at one point on the journal boxes on that side jointly; springs, links and an equalizing lever for supporting the other truck frame on each journal box of one axle and on the journal boxes of the other axle jointly, and a leading connection between said trucks.

In witness whereof, I have hereunto set my hand this 4th day of November, 1910.

ASA F. BATCHELDER.

Witnesses:
 BENJAMIN B. HULL,
 HELEN ORFORD.